United States Patent
Tanchak et al.

(10) Patent No.: US 11,117,774 B2
(45) Date of Patent: Sep. 14, 2021

(54) APPARATUS FOR CONTROLLING SHEET FLATNESS UNDER AN IMAGING SYSTEM ROBUST TO MEDIA CURL

(71) Applicant: XEROX CORPORATION, Norwalk, CT (US)

(72) Inventors: Rachel Lynn Tanchak, Rochester, NY (US); Erwin Ruiz, Rochester, NY (US); Carlos M Terrero, Ontario, NY (US); Roberto A Irizarry, Rochester, NY (US); Glenn Batchelor, Fairport, NY (US); Ali R Dergham, Fairport, NY (US)

(73) Assignee: XEROX CORPORATION, Norwalk, CT (US)

( * ) Notice: Subject to any disclaimer, the term of this patent is extended or adjusted under 35 U.S.C. 154(b) by 167 days.

(21) Appl. No.: 16/391,418

(22) Filed: Apr. 23, 2019

(65) Prior Publication Data
US 2020/0339371 A1 Oct. 29, 2020

(51) Int. Cl.
- *B65H 29/24* (2006.01)
- *B65H 29/58* (2006.01)
- *H04N 1/00* (2006.01)
- *B65H 5/22* (2006.01)

(52) U.S. Cl.
CPC ........... *B65H 29/248* (2013.01); *B65H 5/228* (2013.01); *B65H 29/58* (2013.01); *H04N 1/00647* (2013.01); *B65H 2406/11* (2013.01); *B65H 2801/06* (2013.01); *B65H 2801/39* (2013.01); *G03G 2215/00662* (2013.01)

(58) Field of Classification Search
CPC .. B65H 5/228; B65H 29/248; B65H 2406/10; B65H 2406/11; B65H 2406/111; B65H 2406/1115; B65H 2406/12; B65H 2406/121; B65H 2406/122; B65H 2406/1222
See application file for complete search history.

(56) References Cited

U.S. PATENT DOCUMENTS

| | | | |
|---|---|---|---|
| 5,157,506 A * | 10/1992 | Hannah | G03B 27/735 356/404 |
| 6,612,236 B2 * | 9/2003 | Frankenberger | B41F 21/102 101/232 |
| 7,982,926 B2 * | 7/2011 | Ishikawa | H04N 1/00909 358/496 |
| 8,542,414 B2 * | 9/2013 | Maki | H04N 1/00798 358/488 |
| 8,794,624 B2 | 8/2014 | Herrmann | |
| 10,981,742 B2 * | 4/2021 | Terrero | B65H 29/16 |
| 11,046,544 B2 * | 6/2021 | Irizarry | B65H 29/70 |

* cited by examiner

Primary Examiner — Jeremy R Severson

(57) ABSTRACT

A system for controlling curl in sheets passing beneath a camera includes applying a thin layer of high velocity air to a curved baffle positioned beneath the camera. The high velocity air layer, which will have a tendency to follow the curved baffle (Coanda effect), will divert sheets (Bernoulli effect) towards the curved baffle. By positioning the curved baffle along the media paper path and by applying a uniform air stream to it, a lower pressure area will be created. This will flatten the trajectory of the sheets and thereby remove curl before the sheets pass the camera.

20 Claims, 1 Drawing Sheet

APPARATUS FOR CONTROLLING SHEET FLATNESS UNDER AN IMAGING SYSTEM ROBUST TO MEDIA CURL

CROSS REFERENCE TO RELATED APPLICATIONS

Cross-referenced is commonly assigned U.S. application Ser. No. 16/391,422, filed Apr. 23, 2019, and entitled A SYSTEM FOR PREVENTING PAPER JAMS BETWEEN SUBSYSTEM TRANSITIONS by Roberto A. Irizarry et al.; U.S. application Ser. No. 16/391,428, filed Apr. 23, 2019, and entitled MEDIA HANDLING BETWEEN MODULES ROBUST TO PAPER CURL by Carlos M. Terrero et al., both of which are included in their entirety herein by reference.

BACKGROUND

The present disclosure relates to an apparatus and method for improving process curl removal during paper path transport within an imaging system, and more particularly, to an apparatus and method for controlling media flatness under a scanner.

Current xerographic digital presses utilize cameras or in-line scanners, such as, in-line spectrophotometers in order to control image registration, image quality and other xerography failure modes. Media flatness has to be controlled in order to avoid jamming when entering a scanner module. It is also an imperative to not block the camera opening and to avoid touching the surface of sheets with conventional mechanisms, such as, nip rollers and baffles to avoid having a distorted image due to a curled sheet being too far from the ideal focal point of a scanner as shown in FIG. 1 where sheet 11 has curl that extends above the desired in-focus region of spectrophotometer 12. For ultra-light media (44 gsm), in xerographic presses, the curl could be cross-process inboard/outboard (IB/OB), be multi-nodal within the sheet lead edge to trail edge (LE to TE), or localized (cockle) for inkjet marking systems. Low media stiffness also causes issues with maintaining optimized sheet trajectory underneath scanner openings and paper-path gates. Sheet variations, such as, curl and waviness make it harder to maintain control of a sheet path. Sheet curl dysfunction is created by several noises such as humidity, ink placement, toner amount, grain direction, etc. Curl is one of the primary causes of jams in ultra-light weight media transports. It is also noted that curl or humps in the middle of sheets caused by inkjet created images can also cause focus issues in addition to up and down curl. A typical decurler, as disclosed in U.S. Pat. No. 8,794,624, controls the curl in only the process direction. It cannot flatten multi-nodal curl within a sheet and localized curl due to ink. This inability to control curl will result in jams and image distortion from the scanner module.

Presently, solutions for maintaining sheet flatness in scanning applications include the use of baffles to keep sheets down, but this may not be feasible because they may obstruct the camera opening and moving sheets underneath an imager by a regular nip sets or vacuum transport that have to contend with sheet variations, such as, curl. Scanners rely on the addition of multiple rollers in order to control sheet flatness before and after the scanners' lens area. However, the rollers are not effective on the unsupported area or under the scanners. Directly under a scanner opening, there is no method or apparatus that holds the sheet down flat.

Therefore, there is a need for an improvement in managing sheet curl in xerographic digital presses.

SUMMARY

Accordingly, in answer to this need, a solution is disclosed that includes constraining media down onto a curved baffle surface under an imaging system to maintain a flat sheet during imaging under a sensor. This is accomplished by creating a thin layer of high velocity air on a curved baffle under the sheet. The high velocity air layer, which will have a tendency to follow the curved baffle (Coanda effect), will divert the sheet (Bernoulli effect) towards the curved baffle. By positioning the curved baffle along the media paper path and by applying a uniform or localized air stream to it, the air will follow the surface of the curved baffle and the sheet will follow, thus removing curl from the sheet.

BRIEF DESCRIPTION OF THE DRAWINGS

Various of the above-mentioned and further features and advantages will be apparent to those skilled in the art from the specific article or methods described in the example(s) below, and the claims. Thus, they will be better understood from this description of these specific embodiment(s), including the drawing figures (which are approximately to scale) wherein:

DETAILED DESCRIPTION OF THE PREFERRED EMBODIMENT

Figure 1:
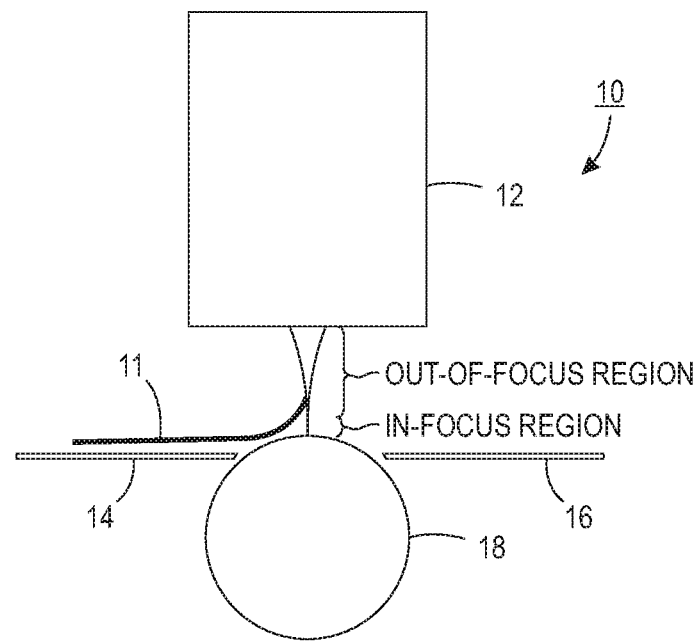
FIG. 1 is a partial side view of an imaging system showing a sheet having up-curl entering an out-of-focus region of an imaging system.

For a general understanding of the features of the disclosure, reference is made to the drawings. In the drawings, like reference numerals have been used throughout to identify identical elements.

Figure 2:
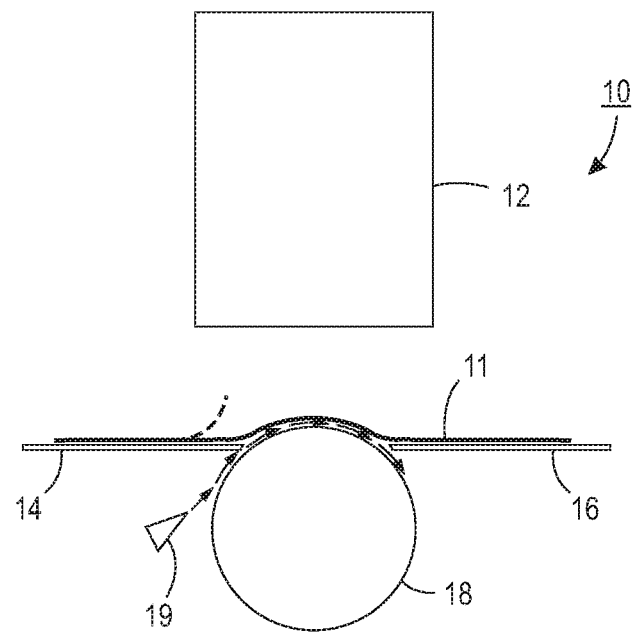
FIG. 2 is a partial side view of the imaging system of FIG. 1 with up-curl in a sheet controlled with an apparatus in accordance with the present disclosure.

A side view of an imaging system 10 is shown in FIG. 1 that includes a sheet 11 on a first transport 14 conveyed towards an imaging position underneath a scanner, such as, a spectrophotometer or camera 12. In scanner applications of this type it is desirable to control the sheet without contacting the top surface while simultaneously maintaining the sheet within a tight focal length. Sheet 11 has pronounced cross process up-curl and can enter an out-of-focus region of the spectrophotometer 12 and result in a blurred/distorted image when entering the imaging system. This can lead to false defect detection, camera opening paper jams and media damage. In accordance with the present disclosure, an apparatus is disclosed that uses the Coanda and Bernoulli effects to control curl in transported media. In an embodiment shown in FIG. 2, an apparatus is disclosed that constrains media down towards the surface of baffle 18 under spectrophotometer 12 to maintain a flat sheet during imaging under the spectrophotometer. Towards that end, a thin layer of high velocity air is created from nozzle 19 over a curved baffle 18 under sheet 11. The high velocity layer of air, which will have a tendency to follow the curved baffle (Coanda effect), will divert the sheet (Bernoulli effect) towards baffle 18. By positioning curved baffle 18 along the media paper path and by applying a uniform or localized air stream to it, the air will follow the curved surface and sheet 11 will follow. It should be understood that the air stream can be redirected or optimized in order to manipulate the exact location of the desired air stream and movement of the sheet. This critical location of air nozzles or air jets with respect to a curved surface will create a lower pressure band (Bernoulli), which will flatten the sheet under the imaging system. Thus, sheets can be maintained flat under an imaging system and maintain position under a focal point resulting in acceptable scans while simultaneously reducing false defect detection when scans are in focus. Additionally, flattening sheets under the imaging system reduces jams and media damage from stubs.

In recapitulation, improved apparatus and methods are disclosed that include applying a uniform or localized air stream over the inboard to outboard length of a curved baffle to produce Coanda effect (air stream flow follows curved surface) to accurately position lighter sheets under an imaging system, such as, an in-line spectrophotometer. The position of the lead edge of the sheet will be under control as it travels over the curved baffle. Any curl or unevenness in the sheet will be removed by the Coanda Effect as the sheet travels over the curved baffle. The sheet will ride on a very thin layer of air close to the curved baffle surface, thus, maintaining the wrap angle and focal point of the sheets passing under the imaging system. Another benefit from applying a uniform or localized air stream over the inboard to outboard length of a curved baffle to produce Coanda effect is the reduction of glass/shim wear caused by rollers. With this system, rollers area unnecessary and thus there will be less wear on the scanner.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others. Unless specifically recited in a claim, steps or components of claims should not be implied or imported from the specification or any other claims as to any particular order, number, position, size, shape, angle, color, or material.

What is claimed is:

1. An apparatus for controlling sheet flatness under an imaging system, comprising:
    a first transport along which sheets are conveyed;
    a second transport along which sheets are conveyed downstream of said first transport;
    a curved member positioned between said first and second transports;
    a charge coupled device array positioned immediately above said curved member for imaging sheets passing beneath said charge coupled device array; and
    a single air flow device that produces a high velocity air stream positioned adjacent said curved member; said air flow device configured to output a layer of high velocity air directly along a surface portion of said curved member such that said high velocity air stream follows said surface portion of said curved member causing said sheets to follow said curved member and simultaneously create a lower pressure band that will flatten said sheets under said imaging system.

2. The apparatus of claim 1, wherein said charge coupled device array is positioned directly above said curved member.

3. The apparatus of claim 2, wherein said charge coupled device array is a camera.

4. The apparatus of claim 1, wherein said high velocity air stream from said air flow device creates a Coanda effect along said surface portion of said curved member.

5. The apparatus of claim 4, wherein said curved member is a baffle.

6. The apparatus of claim 4, wherein said curved member is cylindrical in shape.

7. The apparatus of claim 4, wherein said high velocity air stream from said air flow device is configured to produce Bernoulli effects on said sheets with respect to said curved member.

8. An arrangement for removing curl from sheets conveyed in a paper path, comprising:
    a charge coupled array;
    a first transport for conveying sheets past said charge coupled array towards a downstream device;
    a second transport downstream of and adjacent to said first transport;
    a curved member positioned between said first and second transports;
    a single air flow device positioned adjacent said curved member; and
    wherein said air flow device is configured and located to apply a layer of high velocity air that due to Coanda effect follows along with the sheets a portion of a surface of said curved member and due to the Bernoulli effect constrains the sheets down towards said portion of said surface of said curved member to thereby remove curl from leading edges of the sheets.

9. The apparatus of claim 8, wherein said curved member is cylindrical.

10. The apparatus of claim 9, wherein said charged coupled array is a camera.

11. The apparatus of claim 8, wherein said charged coupled array is a spectrophotometer.

12. The apparatus of claim 11, wherein said spectrophotometer is positioned directly above a center portion of said curved member.

13. The apparatus of claim 12, wherein said first and second transports are vacuum transports.

14. The apparatus of claim 12, wherein said air flow device is positioned with respect to and works in conjunction with said curved member such that a wrap angle of the sheets around said curved member is maintained as the sheets are conveyed past said spectrophotometer.

15. The apparatus of claim 14, wherein said curved member is semi-circular in shape.

16. A method for removing curl from sheets passing under an imaging system, comprising:
    providing a first transport along which sheets are conveyed;
    providing a second transport along which sheets are conveyed downstream of said first transport;
    providing a curved member positioned orthogonally between said first and second transports;
    providing a charge coupled device array positioned immediately above said curved member for imaging sheets passing beneath said charge coupled device array;
    providing an air flow device that produces a high velocity air stream over an inboard to outboard length of said curved member positioned adjacent said curved member;
    configuring said air flow device such that said high velocity air stream follows a surface portion of said curved member and thereby induces said sheets to follow said surface portion of said curved member; and equipping said air flow device with nozzles and locating said nozzles with respect to said surface portion of said curved member such that a lower pressure band is created which will flatten said sheets under said imaging system.

17. The method of claim 16, wherein said curved member is cylindrical.

18. The method of claim 16, including using said high velocity air stream to bend said sheets to follow said curved member and pull said sheets down onto said curved member.

19. The method of claim 16, wherein charge coupled device is a spectrophotometer.

20. The method of claim 19, wherein said high velocity air stream over said inboard to outboard length of said curved member is uniform.

* * * * *